United States Patent
Dai et al.

(10) Patent No.: US 10,611,657 B2
(45) Date of Patent: Apr. 7, 2020

(54) METHOD AND SYSTEM FOR PREPARING FUEL GAS BY UTILIZING ORGANIC WASTE WITH HIGH WATER CONTENT

(71) Applicant: TONGJI UNIVERSITY, Shanghai (CN)

(72) Inventors: Xiaohu Dai, Shanghai (CN); Dezhen Chen, Shanghai (CN); Yuyan Hu, Shanghai (CN); Lijie Yin, Shanghai (CN); Xiaobo Ma, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 16/320,869

(22) PCT Filed: Jul. 29, 2016

(86) PCT No.: PCT/CN2016/092346
§ 371 (c)(1),
(2) Date: Jan. 25, 2019

(87) PCT Pub. No.: WO2018/018615
PCT Pub. Date: Feb. 1, 2018

(65) Prior Publication Data
US 2019/0161374 A1    May 30, 2019

(51) Int. Cl.
| *C02F 11/143* | (2019.01) |
| *C10L 3/08* | (2006.01) |
| *C02F 11/10* | (2006.01) |
| *C10K 1/08* | (2006.01) |
| *C10B 53/00* | (2006.01) |
| *F23G 5/027* | (2006.01) |
| *C10J 3/66* | (2006.01) |
| *C10L 9/08* | (2006.01) |
| *C10J 3/84* | (2006.01) |

(52) U.S. Cl.
CPC ............ *C02F 11/143* (2019.01); *C02F 11/10* (2013.01); *C10B 53/00* (2013.01); *C10J 3/66* (2013.01); *C10J 3/84* (2013.01); *C10K 1/08* (2013.01); *C10L 3/08* (2013.01); *C10L 9/086* (2013.01); *F23G 5/027* (2013.01); *C10J 2300/0906* (2013.01); *C10J 2300/0909* (2013.01); *C10J 2300/0923* (2013.01); *C10J 2300/0926* (2013.01); *C10J 2300/0946* (2013.01); *C10J 2300/0976* (2013.01); *C10J 2300/1603* (2013.01)

(58) Field of Classification Search
CPC .......... C02F 11/143; C02F 11/10; C10L 3/08; C10L 9/086; F23G 5/027; C10B 53/00; C10K 1/08; C10J 3/84; C10J 3/66; C10J 2300/0926; C10J 2300/0976; C10J 2300/0946; C10J 2300/0923; C10J 2300/0909; C10J 2300/0906; C10J 2300/1603
USPC .......................................... 585/240, 241, 242
See application file for complete search history.

(56) References Cited

U.S. PATENT DOCUMENTS

| 5,292,442 A | * | 3/1994 | Khan ...................... C02F 11/10 |
| | | | 210/609 |
| 2013/0149767 A1 | | 6/2013 | Marion et al. |
| 2013/0199920 A1 | | 8/2013 | Demir |
| 2013/0306553 A1 | | 11/2013 | Wittmann |
| 2014/0364676 A1 | | 12/2014 | Chen et al. |

FOREIGN PATENT DOCUMENTS

| CN | 103146413 A | 6/2013 |
| CN | 104355519 A | 2/2015 |
| WO | 2013117000 A1 | 8/2013 |

OTHER PUBLICATIONS

Wu, Qianfang et al. "Progress on hydrothermal carbonization of waste biomass." Environmental Pollution and Control, Jul. 2012, vol. 34, pp. 70-75.
Mumme, Jan et al. "Hydrothermal carbonization of anaerobically digested maize silage." Bioresource Technology, Jul. 2011, vol. 102, pp. 9255-9260.
Kepp, U. et al. "Enhanced stabilization of sewage sludge through thermal hydrolysis—three years of experience with full scale plant." Water Science and Technology, 2000, vol. 42, pp. 89-96.

* cited by examiner

*Primary Examiner* — Thuan D Dang
(74) *Attorney, Agent, or Firm* — Taft Stettinius Hollister LLP; Gerald E. Helget

(57) ABSTRACT

The present invention provides a method and system for preparing fuel gas by utilizing an organic waste with high water content. The method comprises the following steps: 1) providing an organic waste with high water content; 2) performing hydrothermal reaction by using the organic waste with high water content as a reactant to obtain a hydrothermal reaction product; 3) enabling the hydrothermal reaction product to generate steam, and separating a solid product and an oily liquid product in the hydrothermal reaction product; 4) performing gasification reaction by using the solid product, the oily liquid product and the steam as reactants to obtain a gasification reaction product; and 5) purifying the gasification reaction product to obtain clean fuel gas. The present invention further provides a system for preparing fuel gas. The method can be used for preparing clean fuel gas from the organic waste with water content of 60% or more.

14 Claims, 1 Drawing Sheet

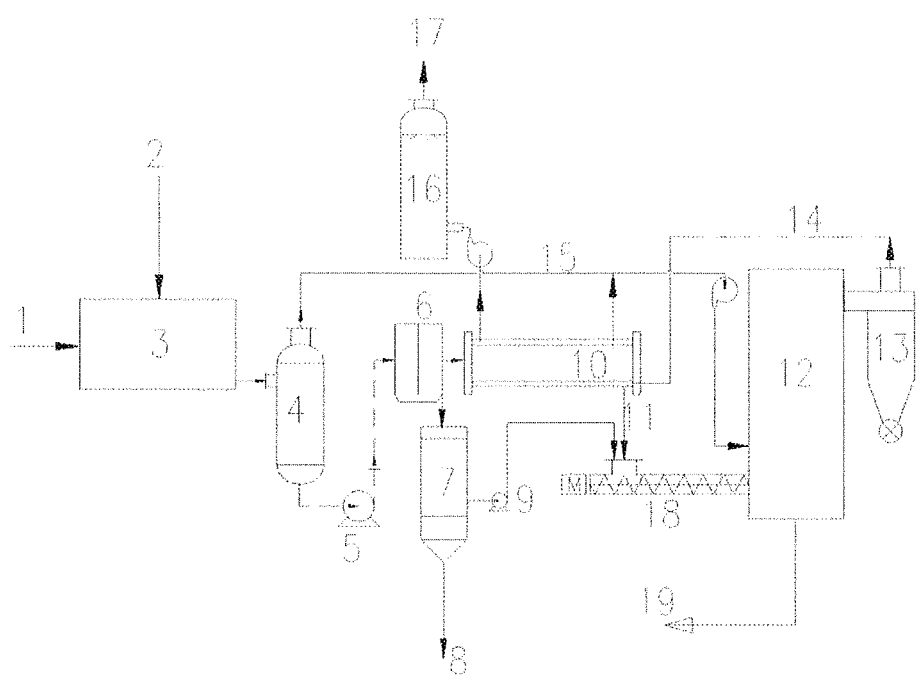

METHOD AND SYSTEM FOR PREPARING FUEL GAS BY UTILIZING ORGANIC WASTE WITH HIGH WATER CONTENT

FIELD OF THE INVENTION

The present invention belongs to the field of waste resource treatment. Specifically, the present invention relates to a method for obtaining clean fuel gas by utilizing an organic waste with high water content. The present invention further relates to a system for obtaining clean fuel gas by utilizing a waste with high water content.

DESCRIPTION OF THE PRIOR ART

At present, organic wastes with high water content, especially those with water content above 60%, such as sewage sludge, oil sludge, industrial sludge, pharmaceutical waste, distiller's grains, kitchen waste, organisms such as sick and dead livestock, are mainly treated by anaerobic fermentation to recover energy. However, there are still many problems in single fermentation treatment, such as that the volume and quantity reduction rate is low, residues cannot be used as fertilizers and need to be further treated for reasons such as high content of heavy metals, the difficulty in treating fermentation wastewater is great when the content of protein and amino acid in the waste is high and the existence of some impurities such as sand affects the operation of a fermentation reactor; and some wastes, though with very high humidity, may not be suitable for fermentation treatment, such as oily sludge and wastes contaminated by infectious germs. Conventional incineration, gasification and pyrolysis cannot deal with materials with high water content, because all water must be evaporated beforehand and energy consumption is enormous. Hydrothermal treatment technology is an effective method for treating homogeneous wastes with high water content in recent years (MUMME J, ECKERVOGT L, PIELERT J, et al. Hydrothermal carbonization of anaerobically digested maize silage [J]. Bioresource Technology, 2011, 102(19): 9255-9260; Kepp U, Machenbach I, Weisz N, et al. Enhanced stabilization of sewage sludge through thermal hydrolysis—three years of experience with full-scale plant [J]. Water Science and Technology, 2000, 42 (9): 89-96), and it can effectively remove water and stabilize the nature of wastes. However, due to low hydrothermal temperature (for example, below 190° C.), solid substances cannot be stabilized and need to be further treated; and there are often oily substances in hydrothermal solution, which make the products to contain liquid, solid and wastewater, and subsequent treatment is more complex. Mechanical drying (drying with heat conducting oil and steam in dryer) is a high-energy-consumption treatment technology, which not only needs to evaporate all water, but also needs further treatment after drying. For sludge, at present in the world, on one hand, importance is attached to energy utilization, and on the other hand, importance is also attached to resource utilization, such as phosphorus (P) recycling. However, at present, the recovery of P cannot be achieved after anaerobic fermentation, and the traditional gasification cannot even maintain the heat balance.

In view of the fact that the existing technologies and systems cannot meet the requirements of economic and efficient treatment of wastes with high water content and recovery of energy contained therein, in order to obtain high-quality clean fuel gas from wastes with high water content more economically and efficiently, the present invention provides an efficient, economical and feasible method and system for recovering clean fuel gas from wastes with high water content.

SUMMARY OF THE INVENTION

The first purpose of the present invention is to provide a method for preparing fuel gas. The technical problem to be solved is to prepare clean fuel gas from an organic waste with water content greater than 60%.

In order to solve the above-mentioned problem, the present invention adopts the following technical solution: a method for preparing fuel gas by utilizing an organic waste with high water content, comprising the following steps:

1) providing an organic waste with high water content;
2) performing hydrothermal reaction by using the organic waste with high water content as a reactant to obtain a hydrothermal reaction product;
3) enabling the hydrothermal reaction product to generate steam, and separating a solid product and an oily liquid product in the hydrothermal reaction product;
4) performing gasification reaction by using the solid product, the oily liquid product and the steam as reactants to obtain a gasification reaction product; and 5) purifying the gasification reaction product to obtain clean fuel gas.

Preferably, the water content of the organic waste with high water content is greater than 60% by weight.

Preferably, the organic waste with high water content is one or a mixture of a plurality of sewage sludge, oil sludge, industrial sludge, pharmaceutical waste, distiller's grains, kitchen waste, and sick and dead livestock.

Preferably, the pH value of the reactant of the hydrothermal reaction is 8.5-9.5.

Preferably, MgO is also added to the reactant of the hydrothermal reaction.

Preferably, the weight of added MgO is 1-3.5% of the dry material of the organic waste with high water content.

Preferably, ferric sulfate or ferric oxide or sodium hydroxide is also added to the reactant of the hydrothermal reaction.

Preferably, the weight of added ferric sulfate or ferric oxide or sodium hydroxide is 0.5-3% of the dry material of the organic waste with high water content.

Preferably, the reaction temperature of the hydrothermal reaction is 220-260° C. and the reaction time is 30-40 min.

Preferably, the hydrothermal reaction product generates the steam through flash evaporation and is cooled.

Preferably, the specific step of separating the solid product and the oily liquid product in the hydrothermal reaction product comprises:

i) separating the hydrothermal reaction product through liquid-solid separation to obtain a water-containing solid product and an oil-containing liquid product;

ii) drying the water-containing solid product to obtain the solid product; and iii) directly using the oil-containing liquid product as the oily liquid product, or further removing the water in the oil-containing liquid product to obtain the oily liquid product.

Preferably, the liquid-solid separation is performed in a pressure filtration type separator or a centrifugal separator, and the operation of "further removing the water in the oil-containing liquid product" is performed in a static separator or is performed through concentration by means of extraction.

Preferably, at least part of the steam generated in the drying process of the water-containing solid product is utilized through the gasification reaction.

Preferably, the drying is performed in a rotary kiln dryer or a vertical plate dryer.

Preferably, the drying is performed by heating, and a heat source needed for heating is provided by the gasification reaction product.

Preferably, the dried solid product and the oil-containing liquid product or the oily liquid product are conveyed to a gasification site through a mixing conveyor, and the solid product and oil-containing liquid product or the oily liquid product are mixed in the conveying process.

Preferably, the temperature of the gasification reaction is 700-800° C.

Preferably, heat needed for the hydrothermal reaction is provided by burning the clean fuel gas generated in step 5).

Preferably, the amount $L_{gas}$ of the burned clean fuel gas is calculated according to the following formula:

$$HHV \times L_{gas} = C_{p,M} \int m_M dT + C_{p,ash} \int m_{ash} dT + C_{p,v} \int m_v dT + Q_p + M \times 2500$$

where HHV is heating value of clean fuel gas, in unit of kJ/Nm$^3$; $L_{gas}$ is in unit of Nm$^3$/kg material; $m_M$ is content of dry material, in unit of %; $m_{ash}$ is content of gasification residue, in unit of %; $m_v$ is total gas output, in unit of Nm$^3$/kg, wherein tar is also included if tar exists; $Q_p$ is total reaction heat and is total heat effect of gasification reaction and enthalpy value for maintaining flue gas component produced during burning at gasification temperature, in unit of kJ/kg; M is residual water content of material after drying, in unit of %, $m_M + M = 100\%$; $C_{p,M}$, $C_{p,ash}$, $C_{p,v}$ are respectively specific heat of dry material, residue and produced gas, respectively in units of kJ/kg·° C., kJ/kg·° C. and kJ/Nm$^3$·° C.

Preferably, the gasification reaction is performed in a fluidized bed gasifier, a fixed bed gasifier or a movable bed gasifier.

Preferably, the purifying comprises particle separation and washing.

Preferably, the particle separation is performed in a cyclone dust collector or a ceramic filter, and the washing is performed in a wet washing tower.

Preferably, the method further comprises: separating particles and/or tar in wastewater after washing and performing gasification.

Preferably, the gasification reaction in step 4) comprises one or more of the following reactions:

     $C_{(s)} + H_2O \rightarrow CO + H_2$     (a)

     $C_{(s)} + 2H_2O \rightarrow CO_2 + 2H_2$     (b)

     $C_{(s)} + CO_2 \rightarrow 2CO$     (c)

Preferably, the heating value of the clean fuel gas obtained in step 6) is greater than 8 MJ/Nm$^3$, the clean fuel gas contains CO and H$_2$, and the content of both HCN and HCNO is not greater than 20 ppm.

The second purpose of the present invention is to provide a system for preparing fuel gas by utilizing an organic waste with high water content. The technical problem to be solved is to prepare clean fuel gas from an organic waste with water content greater than 60%.

In order to solve the above-mentioned problem, the present invention adopts the following technical solution: a system for preparing fuel gas by utilizing an organic waste with high water content, comprising a hydrothermal reactor, a steam generator, a liquid-solid separator, a dryer, an oil-water separator, a mixing conveyor, a gasifier, a gas purification apparatus and a material conveying pipeline, wherein the material conveying pipeline is configured to convey a hydrothermal reaction product produced by the hydrothermal reactor to the steam generator, then respectively convey the steam generated by the steam generator and liquid-solid mixed material to the gasifier and the liquid-solid separator, then respectively convey an oil-containing liquid material and a water-containing solid material discharged from the liquid-solid separator to the oil-water separator and the dryer, then convey the oily liquid material produced by the oil-water separator and the dried solid material to the mixing conveyor, then convey the oily liquid material and the solid material that are mixed to the gasifier, and finally convey gas produced by the gasifier to the gas purification apparatus.

Preferably, the steam generator is a flash evaporator or a sliding-pressure flash tank, the liquid-solid separator is a pressure filtration type separator or a centrifugal separator, the oil-water separator is a static separator or an extraction concentration apparatus, the gasifier is a fluidized bed gasifier, a fixed bed gasifier or a movable bed gasifier, and the dryer is a rotary kiln dryer or a vertical plate dryer.

Preferably, the material conveying pipeline is further configured to convey the steam generated by the dryer to the gasifier.

Preferably, the material conveying pipeline is further configured to convey the gas generated by the gasifier to the dryer to provide a heat source.

Preferably, the gas purification apparatus comprises a fly ash separator and a washer, the material conveying pipeline is configured to firstly convey the gas generated by the gasifier to the fly ash separator, then to the dryer and then to the washer.

Preferably, the fly ash separator is a cyclone dust collector or a ceramic filter, and the washer is a wet washing tower.

The first beneficial effect of the present invention is that the method and system provided by the present invention can obtain more high-quality fuel gas from wastes with water content up to or greater than 60%, and the concentration of nitrogen-containing pollutants such as HCN, HNCO and sulfur-containing pollutants in the fuel gas is obviously reduced.

The second beneficial effect of the present invention is that the method and system provided by the present invention can transform wastes with water content up to or greater than 60% into hydrothermal carbon containing active catalyst uniformly distributed therein. The catalyst is formed by one of MgO, ferric sulfate/ferric oxide/NaOH in the hydrothermal reaction process and is distributed inside and on the surface of all particles of hydrothermal carbon so as to enable the hydrothermal carbon to be under the three-dimensional, omnidirectional and unimpeded catalysis, it has very high activity, can be gasified quickly and thoroughly and reduce tar formation, so as to obtain more high-quality fuel gas, and the concentration of tar and H$_2$S in the fuel gas is also significantly reduced.

The third beneficial effect of the present invention is that the method and system provided by the present invention can effectively promote phosphorus recovery when applied to sewage sludge or other phosphorus containing organic matters; and when applied to harmful wastes such as wastes containing heavy metals, the existence of gel materials such as MgO can enable landfill of residues or use as building materials to be safer.

The fourth beneficial effect of the present invention is that the method and system provided by the present invention are convenient for liquid-solid separation of the hydrothermal reaction product, thus reduce the water content of the separated solid product and decrease the drying energy consumption.

In order to fully understand the purposes, features and effects of the present invention, the concept, specific structure and produced technical effects of the present invention will be further described below with reference to the drawings.

BRIEF DESCRIPTION OF THE DRAWINGS

FIG. 1 is a schematic view of components of a system for preparing fuel gas provided by the present invention according to a preferred embodiment.

In the drawing, 1: organic waste with high water content; 2: additive; 3: hydrothermal reactor; 4: steam generator; 5: conveying pump; 6: liquid-solid separator; 7: oil-water separator; 8: wastewater; 9: oily liquid material; 10: dryer; 11: post-drying solid material; 12: gasifier; 13: fly ash separator; 14: hot combustible gas; 15: steam; 16: washer; 17: clean fuel gas; 18: a mixing conveyor; 19: ash.

DETAILED DESCRIPTION OF THE PREFERRED EMBODIMENTS

"Organic waste with high water content" described herein should be understood as any high-water-content solid or semi-solid articles and substances containing organic matters, including industrial organic waste, agricultural organic waste, domestic garbage, waste naturally formed in the environment and the like, which are formed in production, living and other activities, have lost their original utilization values or which are abandoned or discarded even though they have not lost their utilization values, and which are naturally formed. At present, organic wastes with high water content that need to be disposed of urgently include sewage sludge, oil sludge, industrial sludge, pharmaceutical waste, distiller's grains, kitchen waste, sick and dead livestock, etc. Usually, water content greater than 60% by weight is considered to be typical high water content.

"Hydrothermal reaction product" described herein should be understood as all solid, liquid and gas substances remaining in a container after all reactants and additives in the container react.

"Separating a solid product in the hydrothermal reaction product" described herein should be understood as allowing the solid product obtained through separation to contain a certain amount of liquid components. "Separating an oil-containing liquid product in the hydrothermal reaction product" described herein should be understood as allowing the oil-containing liquid product obtained through separation to contain a certain amount of water, solid and other impurities. "Oil-containing liquid product" described herein should be understood as liquid part of the hydrothermal product, which contains water, oil substances and organic matters dissolved in water. "Solid material" described herein should be understood as allowing a solid material to contain a certain amount of liquid components. "Liquid material" described herein should be understood as allowing a liquid material to contain a certain amount of solid components. "Oily liquid product" described herein should be understood as mainly containing oil substances in the "oil-containing liquid product" and organic matters partially dissolved in water, allowing to contain a certain amount of water, solid and other impurities.

"Clean fuel gas" described herein should be understood as fuel gas after most of solid particles and most of polluting substances dissolved in water or alkali liquor, allowing clean fuel gas to contain a small amount of impurities.

"Hydrothermal reaction" described herein should be understood as reaction in which water and solid exist, in which reactants are heated to 220-260° C., and which is performed at pressure naturally formed under a closed condition.

"Steam generator" described herein should be understood as any apparatus which is applicable to the present invention, generates steam by reduced-pressure evaporation and simultaneously cools the hydrothermal reaction product. "Flash evaporator" described herein should be understood as any apparatus which is applicable to the present invention and evaporates water in the hydrothermal reaction product due to overheating by suddenly lowering the pressure of the hydrothermal reaction product. "Sliding-pressure flash tank" described herein should be understood as any flash tank which is applicable to the present invention, evaporates water in the hydrothermal reaction product and cools itself according to the principle of expanding volume by reducing pressure; and in order to control the speed of water evaporation, the pressure of the flash tank varies according to a certain rule, that is, the pressure is "sliding".

"Pressure filtration type separator" described herein should be understood as any pressure filtration which is applicable to the present invention and performs liquid-solid separation, i.e. a mechanical apparatus that applies certain pressure to an object to enable liquid to leach out by using a filter medium. "Centrifugal separator" described herein should be understood as any apparatus which is applicable to the present invention and performs liquid-solid separation according to a centrifugal principle. "Oil-water separator" described herein should be understood as any apparatus which is applicable to the present invention and enables oil liquid to naturally float up under the effect of gravity to achieve the purpose of oil-water separation, i.e., a static separator; or any apparatus which is applicable to the present invention, enables oil or some organic matters to be separated from water under the extraction effect of organic solvent and realizes the purpose of concentration, i.e., "extraction concentrator". "Rotary kiln dryer" described herein should be understood as any apparatus which is applicable to the present invention, comprises a slightly inclined horizontal cylinder, and performs drying by heating a material flow through the wall surface of the cylinder. Rotary kiln dryer is also called as rotary dryer. "Vertical plate dryer" described herein should be understood as any vertical continuous drying apparatus which is applicable to the present invention, comprises a plurality of rows of vertical hollow clamping plates, allows materials to continuously fall off from the top, allows materials to be discharged from the bottom, allows a hot air flow to pass through the plates, allows outer walls of the plates to be in contact with materials and dries the materials. Vertical plate dryer is also called as plate dryer, belongs to contact dryer mainly adopting conductive drying, and is continuously improved and developed on the basis of plate heat exchanger. "Fluidized bed gasifier" described herein should be understood as any apparatus which is applicable to the present invention and performs gasification according to the following gasification principle: under the effect of a bottom-up gasifying agent, raw material to be gasified maintains continuous and orderly boiling and suspension motions, and rapidly carries out mixing and heat exchange, resulting in uniform temperature and composition of the whole bed layer. Fluidized bed gasifier is also called as boiling bed gasifier. "Fixed bed gasifier" described herein should be understood as any apparatus which is applicable to the present invention and performs gasification according to the following gasification principle: raw materials to be gasified are added from the upper part of the gasifier, the gasifying agent is added from the bottom of the gasifier, and the lift force of the flowing gas does not change the relative position of the solid, that is, the solid is in a relatively fixed state, and the bed height remains basically unchanged. In addition, from a macro perspective, the bulk raw material to be gasified is added from the upper part of the furnace, and the slag is discharged from the bottom of the furnace. "Moving bed gasifier" described herein should be understood as any apparatus which is applicable to the present invention and performs gasification according to the following gasification principle: in the gasification process, the raw materials to be gasified move in a certain direction at a certain speed in the gasifier, which is in parallel with, perpendicular to or intersected with the contact angle of the gasifier. "Cyclone dust collector" described herein should be understood as any dust collecting apparatus which is applicable to the present invention, enables the dust-containing air flow to rotate, separates dust particles from the air flow by means of centrifugal force, collects the dust particles on the wall of the dust collector, and then enables the dust particles to fall into the dust bucket by means of gravity. "Ceramic filter" described herein should be understood as any dust removal apparatus which is applicable to the present invention and contains ceramic filter elements. Obviously, one skilled in the art can choose the appropriate apparatuses according to the prior art, which will not be described in detail here.

FIG. 1 illustrates an optimized specific implementation mode of a system for preparing fuel gas provided by the present invention.

As illustrated in FIG. 1, the system in the specific implementation mode comprises a hydrothermal reactor 3, a steam generator 4, a conveying pump 5, a liquid-solid separator 6, an oil-water separator 7, a dryer 10, a mixing conveyor 18, a gasifier 12, a fly ash separator 13 and a washer 16, wherein the hydrothermal reactor 3 is communicated with the steam generator 4 through a material conveying pipeline, and a hydrothermal reaction product produced by the hydrothermal reactor 3 is conveyed to the steam generator 4; the steam generator 4 is respectively communicated with the gasifier 12 and the liquid-solid separator 6 through the material conveying pipeline, the steam generated by the steam generator 4 is conveyed to the gasifier 12, the remaining liquid-solid mixture material is conveyed to the liquid-solid separator 6, and the conveying pump 5 is mounted between the steam generator 4 and the liquid-solid separator 6; the liquid-solid separator 6 is respectively communicated with the dryer 10 and the oil-water separator 7 through the material conveying pipeline, the oil-containing liquid material produced by the liquid-solid separator 6 is conveyed to the oil-water separator 7, and the water-containing solid material is conveyed to the dryer 10; the dryer 10 is respectively communicated with the gasifier 12 (e.g., incorporated into the material conveying pipeline between the steam generator 4 and the gasifier 12) and the mixing conveyor 18 through the material conveying pipeline, the dried solid is conveyed to the mixing conveyor 18, and the steam generated in the drying process together with the steam generated by the flash evaporator 4 is conveyed to the gasifier 12; the oil-water separator 7 is communicated with the mixing conveyor 18 through the material conveying pipeline, and the oily liquid material produced by the oil-water separator 7 is conveyed to the mixing conveyor 18; the mixing conveyor 18 is communicated with the gasifier 12 through the material conveying pipeline, and the mixing conveyor 18 mixes the dried solid material and the oily liquid material and conveys the mixed material to the gasifier 12; the gasifier 12 is communicated with the fly ash separator 13 through the material conveying pipeline, and the gas generated by the gasifier 12 is conveyed to the fly ash separator 13; the fly ash separator 13 is communicated with the dryer 10 through the material conveying pipe, and the gas after removal of particles is conveyed to the dryer 10 to provide a heat source for the dryer 10; and the dryer 10 is communicated with the washer 16 through the material conveying pipeline, and the gas after removal of particles is conveyed to the washer 16. In addition, the washer 16 may also be communicated with the liquid-solid separator 6 through the material conveying pipeline. If there is a small amount of tar and particles in the wastewater discharged from the washer 16, they can be separated and sent back to the mixing conveyor 18 and then back to the gasifier 18.

In this specific implementation mode, the steam generator 4 is a flash evaporator or a sliding-pressure flash tank. The hydrothermal reactor 3 is an intermittent hydrothermal reactor or a continuous hydrothermal reactor or other suitable hydrothermal reaction apparatus. The liquid-solid separator 6 is a pressure filtration type separator or a centrifugal separator or other suitable liquid-solid separation apparatus. The oil-water separator 7 is a static separator or other suitable oil-water separation apparatus, or a dichloromethane extractor. The gasifier 12 is a fluidized bed gasifier, a fixed bed gasifier or a movable bed gasifier or other suitable gasification apparatus. The dryer 10 is a rotary kiln dryer or a vertical plate dryer or other suitable drying apparatus. The fly ash separator 13 is a cyclone dust collector, a ceramic filter or other suitable fly ash separation apparatus. The washer 16 is a wet washing tower or other suitable washing apparatus.

The system in the specific implementation mode is used for recovering clean fuel gas from wastes with water content greater than 60%. The specific steps of the method for preparing fuel gas by using the system illustrated in FIG. 1 are as follows.

As illustrated in FIG. 1, the organic waste 1 with high water content is placed in the hydrothermal reactor 3, an additive 2 is added, reaction is performed for 30-40 min at temperature of 220-260° C., and the reaction product enters the steam generator 4 and is decompressed to generate steam 15; and the hydrothermal reaction product after steam generation has been cooled, liquid-solid separation is performed through the liquid-solid separator 6, the oil-containing liquid material enters the oil-water separator 7, the water-containing solid material is fed into the dryer 10, the dried solid material 11 is mixed with the oily liquid material separated from the oil-water separator 7 through the mixing conveyor 18, the mixture is fed into the gasifier 12, and the steam produced during drying together with the steam produced by the steam generator 4 is fed into the gasifier 12 as a gasifying agent. The combustible gas produced in the gasifier 12, after particles are separated by the fly ash separator 13, is fed into the dryer 10 as a heat source, and after cooling, it enters the washer 16 for washing. The purified clean fuel gas 17 can be used. If there is a small amount of tar and particles in the wastewater discharged from the washer 16, they are still separated and sent back to the mixing conveyor 18 and back to the gasifier 18.

In this specific implementation mode, the additive 2 is MgO, or the additive 2 contains one of MgO and ferric sulfate/ferric oxide/NaOH. The specific adding method is as follow: the amount of MgO to be added equals to 1-3.5% of the absolute dry solid material. The amount of added ferric sulfate/ferric oxide/NaOH equals to 0.5-3%, such that the pH is near 8.5-9.5. MgO is continuously added when the pH is slightly low.

In this specific implementation mode, the reaction temperature in the gasifier 12 is in the range of 700-800° C., which is maintained by burning the combustible gas produced by the system provided by the present invention. The specific implementation mode is as follow: a fuel gas burner is used for burning the produced fuel gas 17, and the burning amount $L_{gas}$ is calculated as follow:

$$HHV \times L_{gas} = C_{p,M} \int m_M dT + C_{p,ash} \int m_{ash} dT + C_{p,v} \int m_v dT + Q_p + M \times 2500$$

wherein HHV is heating value of clean fuel gas, in unit of kJ/Nm³; $L_{gas}$ is in unit of Nm³/kg material; $m_M$ is content of dry material, in unit of %; $m_{ash}$ is content of gasification residue, in unit of %; $m_v$ is total gas output, in unit of Nm³/kg, wherein tar is also included if tar exists; $Q_p$ is total reaction heat and is total heat effect of gasification reaction and enthalpy value for maintaining flue gas component produced during burning at gasification temperature, in unit of kJ/kg; M is residual water content of material after drying, in unit of %, $m_M + M = 100\%$; $C_{p,M}$, $C_{p,ash}$, $C_{p,v}$ are respectively specific heat of dry material, residue and produced gas, respectively in units of kJ/kg·° C., kJ/kg·° C. and kJ/Nm³·° C.

By adopting the method and system for obtaining clean fuel gas from wastes with high water content provided by this specific implementation mode, the effect of obtaining fuel gas containing H₂ and CO as the main gas components from wastes with water content up to or greater than 60% can be realized, the concentration of nitrogen-containing pollutants such as HCN and HNCO in the fuel gas is obviously reduced as compared with that of the gas obtained by conventional gasification, and the content of tar and H₂S is obviously reduced, which is realized based on the following principles:

(1) In the process of hydrothermal treatment, more than 50% of N contained in the waste with high water content is dissolved into liquid, Cl and F will also be dissolved into the liquid and thus the content of N in solid decreases greatly, resulting that the volatilization of the N-containing pollutants is significantly reduced; and thus the concentration of nitrogen-containing pollutants such as HCN and HNCO in the gaseous product is decreased.

(2) MgO and ferric sulfate/ferric oxide/NaOH added in hydrothermal reaction intrinsically have the effect of fixing H₂S. After hydrothermal reaction, components such as dolomite, olivine, clay ore and Fe₃O4 produced by MgO and ferric sulfate/ferric oxide in the hydrothermal process are uniformly distributed in every particle structure of the solid material. They not only have the effect of fixing sulfur, but also enable the gasification reaction to be performed under very good catalytic conditions, and the content of tar and the temperature required for gasification will also be greatly reduced.

(3) The following reactions occur when steam is used as a gasification medium:

$$C_{(s)} + H_2O \rightarrow CO + H_2 \qquad (a)$$

Endothermic reaction; (the reaction is facilitated when temperature is higher than 720° C.; 700° C., ΔH=+105.2 kJ/mol; 800° C., ΔH=+97.8 kJ/mol; 900° C., ΔH=+89.3 kJ/mol)

Endothermic reaction; (the reaction is facilitated when temperature is lower than 720° C.; 700° C., ΔH=+114.7 kJ/mol; 800° C., ΔH=+116.7 kJ/mol; 900° C., ΔH=+117.5 kJ/mol)

In gasification reaction, the flue gas produced by the burner is directly heated to maintain the reaction temperature. The burner burns the fuel gas 17 produced by the system provided by the present invention. The main products are CO₂ and H₂O. In addition to the water gas reaction mentioned above, further there is the following reaction:

$$C_{(s)} + CO_2 \rightarrow 2CO \qquad (c)$$

Endothermic reaction; (the reaction is facilitated when temperature is higher than 800° C.; 700° C., ΔH=+95.4 kJ/mol; 800° C., ΔH=+78.4 kJ/mol; 900° C., ΔH=+60.5 kJ/mol)

(4) Through the above-mentioned reactions, the element C in the solid product 11 after hydrothermal treatment is converted into clean combustible gas. The use of the additive 2 enables the reaction in the gasifier 12 to be catalytic gasification. Formation of tar can be avoided when the reaction temperature is 700-800° C.

(5) The oil separated by the oil-water separator is mixed with the solid in the mixing conveyor 18 and the mixture enters the gasifier. Since the oil is evenly distributed on the solid containing catalyst components such as dolomite, olivine, clay ore, Fe₃O₄ and Na₂O, the gasification reaction is enabled to be performed under good catalytic conditions, it can be gasified and degraded into combustible gas at lower temperature, and the gas output is increased.

Residues after gasification mainly contain inorganic matters and a small amount of carbon. Because of the existence of carbon, heavy metals contained in the residues are prevented from being leached in the subsequent process of being in contact with water. Meanwhile, the existence of gel materials such as MgO can enable landfill of residues or use as building materials to be safer.

The method and system provided by this specific implementation mode have the following beneficial effects:

(1) It can prevent the water in the waste with high water content from being all evaporated to complete the gasification reaction and obtain clean fuel gas; and energy is saved as compared with the mechanical drying of the waste and then gasification.

(2) Compared with the existing anaerobic digestion technology, the waste with high water content can be more thoroughly treated without leaving a large amount of residues that need to be further treated; and oil sludge that cannot be treated by the anaerobic digestion technology, wastes contaminated by pathogens, etc., can be treated.

(3) Compared with the existing gasification technology, since the low-cost catalysts formed by hydrothermal reaction are uniformly distributed in each solid particle in advance, high-efficiency catalytic gasification can be realized in the gasification step and there is no need to use high temperature to prevent tar from being produced.

(4) Due to the addition of MgO, ferric sulfate/ferric oxide/NaOH, liquid-solid separation of the hydrothermal reaction product is easier, and the energy consumption by drying before the gasification of the solid product is decreased.

(5) The steam produced during flash evaporation of the hydrothermal reaction product and the steam produced during the drying of the solid product are used as a gasification medium in the system, which not only avoids the treatment of odorous steam, but also effectively utilizes the energy carried by these steam and improves the energy efficiency of the system.

(6) The mixture of oil and solid after oil-water separation are gasified in the system, which not only reduces the step of oil retreatment, but also reuses the catalyst contained in the solid to realize catalytic gasification.

(7) The hydrothermal liquid separated from the oil-water separator 7 dissolves a large amount of COD, contains rich $C_1$-$C_5$ volatile fatty acids accounting for more than 20% of the total COD of the treated waste, and dissolves more than 50% of the total nitrogen of the waste. The hydrothermal liquid is suitable for nitrogen removal by denitrification, such that the system for nitrogen removal by denitrification of the sewage plant does not need additional carbon sources. If P is dissolved at the same time, phosphorus can be recovered by adopting methods such as sedimentation of struvite before being sent to the system for nitrogen removal by denitrification of the sewage plant, and thus the maximum utilization of resources is realized.

Embodiment 1

Certain sewage sludge had water content of 80%. For other properties, see Table 1.

TABLE 1

Industrial analysis and elemental analysis of sewage sludge (wt. %)

| Industrial analysis (ad) | | | | |
|---|---|---|---|---|
| $M_{ad}$ | $A_{ad}$ | $V_{ad}$ | $FC_{ad}$ | HHV (MJ/kg) |
| 6.57 | 45.68 | 44.45 | 3.3 | 11.83 |

| Elemental analysis (ad) | | | |
|---|---|---|---|
| C | H | N | O |
| 25.27 | 4.2 | 3.05 | 16.23 |

The system and method described in the above-mentioned specific implementation mode were used to prepare fuel gas. The waste 1 contained 20% of solid, MgO which is 3% of the mass of the dry matter was added, then 2% of ferric sulfate was added in the form of saturated ferric sulfate solution, continuous stirring was performed and the addition of saturated ferric sulfate solution was stopped till the pH was about 9, then heating to 260° C. was performed in the hydrothermal reactor for reaction for 30-40 min, the reaction product entered the steam generator 4, the steam generator 4 is a sliding-pressure flash tank, and the reaction product entered the sliding-pressure flash tank to expand volume by varying pressure till the pressure was reduced by 1 atm to generate steam 15; the material after flash evaporation was subjected to liquid-solid separation by the liquid-solid separator 6 (the liquid-solid separator 6 is a pressure filtration type liquid-solid separator), the oil-containing liquid material entered the oil-water separator 7 (the oil-water separator 7 performed extraction by adopting dichloromethane to separate oily substances from water), the water-containing solid material was fed into the dryer 10, the dryer 10 is of a rotary kiln type, high-temperature fuel gas passed from the outside, the material to be dried passed from the inside, the dried solid material 11 was mixed with the oily liquid material separated by the oil-water separator 7 through the mixing conveyor 18 (the mixing conveyor 18 is a double-screw mixing conveyor), the mixture was fed into the gasifier 12 and the gasifier 12 is of a movable bed type. The steam produced in the dryer 10 together with the steam 15 produced by the flash evaporator 7 was fed into the gasifier 12 as the gasifying agent. The combustible gas produced in the gasifier 12, after particles were separated by the particle separator 13, was fed into the outer side air flow passage of the dryer 10 as a heat source to dry the material after hydrothermal treatment, and the combustible gas was cooled and then entered the washer 16 for washing. The purified clean fuel gas 17 can be used. If there is a small amount of tar and particles in the wastewater discharged from the washer 16, they are still separated and sent back to the mixing conveyor 18 and then back to the gasifier 18. Upon testing, the heating value of the clean fuel gas 17 is 8.909 MJ/Nm$^3$; the content of HNCO, HCN and H$_2$S in the fuel gas before passing the washer 16 is respectively 0.3 ppm, 0.6 ppm and 20 ppm. The output of the clean fuel gas 17 is 230 Nm$^3$/t raw material (the raw material refers to sewage sludge before hydrothermal reaction), which is larger than that obtained through anaerobic fermentation. The burned fuel gas is 40% of the total amount, which was used for heating the gasifier 12 and heating the hydrothermal reactor 3. The comprehensive heat recovery efficiency was 52% of the higher heating value (HHV) of the original sludge; if anaerobic fermentation treatment was performed, the biogas production rate is 50 m$^3$/t sludge, and the heating value is 19.748 MJ/Nm$^3$, and 20% of biogas needed to be consumed to maintain the fermentation temperature of the system; the comprehensive heat recovery efficiency was 33.4% of the high heating value (HHV) of the original sludge; if the traditional gasification process was adopted, in which sludge was dried first and then gasified, the output of the fuel gas obtained through testing was 300 Nm$^3$/t, the heating value of the fuel gas was 5.126 MJ/Nm$^3$, and it was not enough to evaporate all the water by burning all the gas. Therefore, compared with the prior art, the present invention has the advantages of energy recovery and resource recovery.

Embodiment 2

Tank bottom sludge of an oil refinery of a certain project was taken, with water content of 78.72%, volatile content of 70.08% (dry basis), fixed carbon content of 5.10%, ash content of 24.83%, heating value of 23.42 MJ/kg. The system and method described in the above-mentioned specific implementation mode were used to prepare fuel gas. MgO which is 3% of the mass of the dry matter was added, 2.5% of ferric sulfate was added in the form of saturated solution, continuous stirring was performed till the pH was about 9, then heating to 220° C. was performed in the hydrothermal reactor for reaction for 30-40 min, the reaction product entered the steam generator 4, the steam generator 4 is a flash evaporator, and the reaction product entered the flash evaporator to perform flash evaporation to generate 100° C. steam 15; the material after flash evaporation was subjected to liquid-solid separation by the liquid-solid separator 6 (the liquid-solid separator 6 is a pressure filtration type liquid-solid separator), the oil-containing liquid material entered the oil-water separator 7 (the oil-water separator 7 is a static oil-water separator), the water-containing solid material was fed into the dryer 10, the dryer 10 is of a rotary kiln type, high-temperature fuel gas 14 passed from the cylindrical outer wall of the kiln, the material to be dried was heated by the inner wall, and the dried solid material 11 was mixed with the oily liquid material separated by the oil-water separator through the mixing conveyor 18 (the mixing conveyor 18 is a double-screw mixing conveyor); the separated oily substance was mixed with the dried material, the mixture was fed into the gasifier 12 and the gasifier 12 is of a fixed bed type. The steam produced in the dryer 10 together with the steam 15 produced by the flash tank was fed into the gasifier 12 as the gasifying agent. The combustible gas produced in the gasifier 12, after particles were separated by the particle separator 13, was fed into the outer side air flow passage of the dryer 10 as a heat source to dry the material after hydrothermal treatment, and the combustible gas was cooled and then entered the washer 16 for washing. The purified clean fuel gas 17 can be used. Upon testing, the heating value of the clean fuel gas 17 is 9.6 MJ/Nm$^3$; the content of HNCO, HCN and H$_2$S in the fuel gas before passing the washer 16 is respectively 0.1 ppm, 0.4 ppm and 21 ppm. The output of the clean fuel gas 17 is 390 Nm$^3$/t raw material (the raw material refers to tank bottom sludge before hydrothermal reaction). The burned fuel gas is 33%, which was used for heating the gasifier 12 and heating the hydrothermal reactor 3. If there is a small amount of tar and particles in the wastewater discharged from the washer 16, they are still separated and sent back to the mixing conveyor 18 and then back to the gasifier 12. The energy recovery rate is 50.3% of the higher heating value of the raw material.

Embodiment 3

A certain batch of sick and dead pigs was taken, with water content of 69.2%. Upon analysis, the dry-basis lower heating value is 20.5 MJ/kg, the ash content is 12.5% (dry basis) and the fixed carbon content is 5.18%.

The system and method described in the above-mentioned specific implementation mode were used to prepare fuel gas. The bodies of the dead pigs were cut into blocks and placed in an intermittent hydrothermal reactor, MgO which is 3.5% of the mass of the dry matter was added, then 0.5% of NaOH was added (in the form of 20% solution), heating to 230° C. was performed in the intermittent hydrothermal reactor for reaction for 30-40 min, the reaction product entered the steam generator 4, the steam generator 4 is a flash evaporator, and the reaction product entered the flash evaporator to perform flash evaporation to generate 100° C. steam 15; the material after flash evaporation was subjected to liquid-solid separation by the liquid-solid separator 6 (the liquid-solid separator 6 is a centrifugal liquid-solid separator), the oil-containing liquid material entered the static oil-water separator 7, and the separated oily substance was preferentially used for recovery of industrial grease, etc. The water-containing solid material was fed into the dryer 10, the dryer 10 is of a rotary kiln type, high-temperature fuel gas 14 passed from the outside, the material to be dried passed from the inside, and the dried solid material 11 was mixed with the unrecovered oily liquid material through the mixing conveyor 18 (the mixing conveyor 18 is a double-screw mixing conveyor), the mixture was fed into the gasifier 12 and the gasifier 12 is of a fluidized bed type. The steam produced in the dryer 10 together with the steam 15 produced by the flash tank was fed into the gasifier 12 as the gasifying agent through a steam compressor. The combustible gas produced in the gasifier 12, after particles were separated by the particle separator 13, was fed into the outer side air flow passage of the dryer 10 as a heat source to dry the material after hydrothermal treatment, and the combustible gas was cooled and then entered the washer 16 for washing. The purified clean fuel gas 17 can be used. Upon testing, the heating value of the clean fuel gas 17 is 9.01 MJ/Nm$^3$; the content of HNCO, HCN and H$_2$S in the fuel gas before passing the washer 16 is respectively 2 ppm, 3 ppm and 12 ppm; and if the waste is gasified directly, the content of HNCO, HCN and H$_2$S in the gasification product is respectively 6 ppm, greater than 15 ppm and 216 ppm.

The output of the clean fuel gas 17 is 530 Nm$^3$/t raw material (the raw material refers to sick and dead pigs before hydrothermal reaction). The burned fuel gas is 35%, which was used for heating the gasifier 12 and heating the hydrothermal reactor 3. If there is a small amount of tar and particles in the wastewater discharged from the washer 16, they are still separated and sent back to the mixing conveyor 18 and then back to the gasifier 12. The energy recovery rate is 49.65% of the higher heating value (HHV) of the raw material.

Embodiment 4

A certain batch of decoction dregs of a pharmaceutical factory was taken, with water content of 79.2%. Upon analysis, the dry-basis lower heating value is 17.1 MJ/kg, the ash content is 19.13% (dry basis) and the fixed carbon content is 4.98% (dry basis).

The system and method described in the above-mentioned specific implementation mode were used to prepare fuel gas. The decoction dregs were placed in a continuous hydrothermal reactor, MgO which is 1% of the mass of the dry matter was added, then 3% of ferric oxide was added (in the form of suspension), continuous stirring was performed till the pH was about 9.5, then heating to 260° C. was performed in the continuous hydrothermal reactor for reaction for 30-40 min, the reaction product entered the steam generator 4, the steam generator 4 is a sliding-pressure flash tank, and the reaction product entered the sliding-pressure flash tank to perform continuous reduced-pressure evaporation to generate steam 15 till the pressure was reduced to 1 atm; the material after reduced-pressure evaporation was subjected to liquid-solid separation by the liquid-solid separator 6 (the liquid-solid separator 6 is a centrifugal liquid-solid separator 6), the oil-containing liquid material entered the oil-water separator 7 (the oil-water separator 7 is an extraction separation concentrator), the water-containing solid material was fed into the dryer 10, the dryer 10 is of a vertical descending plate type, and the outer wall was in contact with the material to be dried; high-temperature fuel gas 14 passed from the inside, and the dried solid material 11 was mixed with the oily liquid material separated by the oil-water separator 7 through the mixing conveyor 18 (the mixing conveyor 18 is a double-screw mixing conveyor), the mixture was fed into the gasifier 12 and the gasifier 12 is of a fluidized bed type. The steam produced in the dryer 10 together with the steam 15 produced by the flash tank was fed into the gasifier 12 as the gasifying agent through a steam compressor. The combustible gas produced in the gasifier 12, after particles were separated by the particle separator 13, was fed into the outer side air flow passage of the dryer 10 as a heat source to dry the material after hydrothermal treatment, and the combustible gas was cooled and then entered the washer 16 for washing. The purified clean fuel gas 17 can be used. Upon testing, the heating value of the clean fuel gas 17 is 8.96 MJ/Nm$^3$; the content of HNCO, HCN and H$_2$S in the fuel gas before passing the washer 16 is respectively 1 ppm, 1.5 ppm and 14 ppm; and if the waste is gasified directly, the content of HNCO, HCN and H$_2$S in the gasification product is respectively 7 ppm, greater than 17 ppm and 210 ppm.

The output of the clean fuel gas 17 is 290 Nm³/t raw material (the raw material refers to decoction dregs before hydrothermal reaction). The burned fuel gas is 31%, which was used for heating the gasifier 12 and heating the hydrothermal reactor 3. The net energy recovery rate is 50.41% of the higher heating value (HHV) of the raw material.

Embodiment 5

A certain batch of kitchen wastes was taken, with water content of 77%. Upon analysis, the dry-basis lower heating value is 18.2 MJ/kg, the ash content is 20.93% (dry basis) and the fixed carbon content is 5.08% (dry basis).

The system and method described in the above-mentioned specific implementation mode were used to prepare fuel gas. The kitchen wastes were pre-crushed and then placed in a continuous hydrothermal reactor, MgO which is 3% of the mass of the dry matter was added, then 0.5% of NaOH was added (in the form of 50% solution), heating to 230° C. was performed in the continuous hydrothermal reactor for reaction for 30-40 min, the reaction product entered the steam generator 4, the steam generator 4 is a flash evaporator, and the reaction product entered the flash evaporator to perform flash evaporation to generate 100° C. steam 15; the material after flash evaporation was subjected to liquid-solid separation by the liquid-solid separator 6 (the liquid-solid separator 6 is a centrifugal liquid-solid separator), the oil-containing liquid material entered the oil-water separator 7 (the oil-water separator 7 is a static oil-water separator), and the separated oily substance can be used for manufacturing biological diesel. The water-containing solid material was fed into the dryer 10, the dryer 10 is of a rotary kiln type, high-temperature fuel gas 14 passed from the outside, the material to be dried passed from the inside, and the dried solid material 11 was mixed with the unrecovered oily liquid material from the oil-water separator 7 through the mixing conveyor 18 (the mixing conveyor 18 is a double-screw mixing conveyor), the mixture was fed into the gasifier 12 and the gasifier 12 is of a fixed bed type. The steam produced in the dryer 10 together with the steam 15 produced by the flash tank was fed into the gasifier 12 as the gasifying agent through a steam compressor. The combustible gas produced in the gasifier 12, after particles were separated by the particle separator 13, was fed into the outer side air flow passage of the dryer 10 as a heat source to dry the material after hydrothermal treatment, and the combustible gas was cooled and then entered the washer 16 for washing. The purified clean fuel gas 17 can be used. Upon testing, the heating value of the clean fuel gas 17 is 8.87 MJ/Nm³; the content of HNCO, HCN and $H_2S$ in the fuel gas before passing the washer 16 is respectively 1 ppm, 1.6 ppm and 12 ppm; and if the waste is gasified directly, the content of HNCO, HCN and $H_2S$ in the gasification product is respectively 6.7 ppm, 16 ppm and 220 ppm.

When the oily substance produced by the oil-water separator 7 is not separately recovered, the output of the clean fuel gas 17 is 365 Nm³/t raw material (the raw material refers to kitchen wastes before hydrothermal reaction). The burned fuel gas is 35%, which was used for heating the gasifier 12 and heating the hydrothermal reactor 3. The net energy recovery rate is 50.27% of the higher heating value (HHV) of the raw material.

The preferred specific embodiments of the present invention are described in detail above. It should be understood that one skilled in the art can make many modifications and changes according to the concept of the present invention without contributing any inventive labor. Therefore, any technical solution that can be obtained by one skilled in the art through logical analysis, reasoning or limited experiments on the basis of the prior art in accordance with the concept of the present invention shall be within the protection scope defined by the claims.

The invention claimed is:

1. A method for preparing fuel gas by utilizing an organic waste with water content greater than 60% by weight, wherein the method comprises the following steps:
   1) providing an organic waste with water content greater than 60% by weight;
   2) performing hydrothermal reaction by using the organic waste with water content greater than 60% by weight as a reactant to obtain a first reaction product;
   3) enabling the first reaction product to generate steam, and separating a solid product and an oily liquid product in the first reaction product;
   4) performing gasification reaction by using the solid product, the oily liquid product and the steam as reactants to obtain a second reaction product; and
   5) purifying the second reaction product to obtain clean fuel gas-;
   wherein MgO is also added to the reactant of the hydrothermal reaction, and the weight of added MgO is 1-3.5% of the dry material of the organic waste with water content greater than 60% by weight.

2. The method according to claim 1, wherein the organic waste with water content greater than 60% by weight is one or a mixture of a plurality of sewage sludge, oil sludge, industrial sludge, pharmaceutical waste, distiller's grains, kitchen waste, and sick and dead livestock.

3. The method according to claim 1, wherein the pH value of the reactant of the hydrothermal reaction is 8.5-9.5.

4. The method according to claim 1, wherein ferric sulfate or ferric oxide or sodium hydroxide is also added to the reactant of the hydrothermal reaction.

5. The method according to claim 4, wherein the weight of added ferric sulfate or ferric oxide or sodium hydroxide is 0.5-3% of the dry material of the organic waste with water content greater than 60% by weight.

6. The method according to claim 1, wherein the reaction temperature of the hydrothermal reaction is 220-260° C. and the reaction time is 30-40 min.

7. The method according to claim 1, wherein the first reaction product generates the steam through flash evaporation and is cooled.

8. The method according to claim 1, wherein the specific step of separating the solid product and the oily liquid product in the first reaction product comprises:
   i) separating the first reaction product through liquid-solid separation to obtain a water-containing solid product and an oil-containing liquid product;
   ii) drying the water-containing solid product to obtain the solid product; and
   iii) directly using the oil-containing liquid product as the oily liquid product, or further removing the water in the oil-containing liquid product to obtain the oily liquid product.

9. The method according to claim 8, wherein at least part of the steam generated in the drying process of the water-containing solid product is utilized through the gasification reaction.

10. The method according to claim 8, wherein the drying is performed by heating, and a heat source needed for heating is provided by the second reaction product.

11. The method according to claim 8, wherein the dried solid product and the oil-containing liquid product or the oily liquid product are conveyed to a gasification site through a mixing conveyor, and the solid product and oil-containing liquid product or the oily liquid product are mixed in the conveying process.

12. The method according to claim 1, wherein the temperature of the gasification reaction is 700-800° C., which is maintained by burning the clean fuel gas, wherein the burning amount $L_{gas}$ of the clean fuel gas is calculated according to the following formula:

$$HHV \times L_{gas} = C_{p,M} \int m_M dT + C_{p,ash} \int m_{ash} dT + C_{p,v} \int m_v dT + Q_p + M \times 2500$$

wherein HHV is heating value of clean fuel gas, in unit of kJ/Nm$^3$; $L_{gas}$ is in unit of Nm$^3$/kg material; $m_M$ is content of dry material, in unit of %; $m_{ash}$ is content of gasification residue, in unit of %; $m_v$ is total gas output, in unit of Nm$^3$/kg, wherein tar is also included if tar exists; $Q_p$ is total reaction heat and is total heat effect of gasification reaction and enthalpy value for maintaining flue gas component produced during burning at gasification temperature, in unit of kJ/kg; M is residual water content of material after drying, in unit of %, $m_M$+M=100%; $C_{p,\ M}$, $C_{p,\ ash}$, $C_{p,\ v}$ are respectively specific heat of dry material, residue and produced gas, respectively in units of kJ/kg·° C., kJ/kg·° C. and kJ/Nm$^3$·° C.

13. The method according to claim 1, wherein heat needed for the hydrothermal reaction is provided by burning the clean fuel gas generated in step 5).

14. The method according to claim 1, wherein the heating value of the clean fuel gas obtained in step 5) is greater than 8 MJ/Nm$^3$, the clean fuel gas contains CO and $H_2$, and the content of both HCN and HCNO is not greater than 20 ppm.

* * * * *